(12) United States Patent
Van Leekwijck et al.

(10) Patent No.: US 10,200,297 B2
(45) Date of Patent: Feb. 5, 2019

(54) METHODS, QUEUEING SYSTEM, NETWORK ELEMENT AND NETWORK SYSTEM FOR QUEUEING AND PROCESSING OF PACKETS

(71) Applicant: Provenance Asset Group LLC, Essex, CT (US)

(72) Inventors: Werner Van Leekwijck, Wilrijk (BE); Koen De Schepper, Edegem (BE)

(73) Assignee: Provenance Asset Group LLC, Pittsford, NY (US)

( * ) Notice: Subject to any disclaimer, the term of this patent is extended or adjusted under 35 U.S.C. 154(b) by 0 days.

(21) Appl. No.: 15/553,381

(22) PCT Filed: Mar. 18, 2016

(86) PCT No.: PCT/EP2016/055909
§ 371 (c)(1),
(2) Date: Aug. 24, 2017

(87) PCT Pub. No.: WO2016/150833
PCT Pub. Date: Sep. 29, 2016

(65) Prior Publication Data
US 2018/0115493 A1    Apr. 26, 2018

(30) Foreign Application Priority Data
Mar. 23, 2015 (EP) ................................ 15305416

(51) Int. Cl.
*H04L 12/873* (2013.01)
*H04L 12/875* (2013.01)

(52) U.S. Cl.
CPC .......... *H04L 47/564* (2013.01); *H04L 47/522* (2013.01)

(58) Field of Classification Search
CPC .. H04L 47/10; H04W 28/02; H04W 28/0205; H04W 28/021; H04W 28/0247;
(Continued)

(56) References Cited

U.S. PATENT DOCUMENTS 6,715,143 B1 *   3/2004   Chantrain ............... H04L 29/06
                                                         717/174
8,588,063 B2 *   11/2013  Van Leekwijck ....... H04L 47/10
                                                         370/229

(Continued)

OTHER PUBLICATIONS

International Search Report PCT/ISA/210 for International Application No. PCT/EP2016/055909 dated May 3, 2016.

*Primary Examiner* — Sharad Rampuria
(74) *Attorney, Agent, or Firm* — Dinsmore & Shohl LLP

(57) ABSTRACT

Method for queueing packets, each packet of the packets including timing information representing a remaining time until a deadline associated with delivery at its destination; the system including N queues, each queue thereof being configured for buffering at least one packet, the N queues having a cyclic order; the method including keeping track of a pointer, initially pointing to a queue of the N queues; afterwards, repeatedly incrementing the pointer over the N queues, according to the cyclic order, after each passing of a scheduling interval S; enqueueing each packet of the packets in a queue of the N queues, that queue differing from the queue to which the pointer is pointing, based on the packet's timing information and taking into account the cyclic order; and dequeueing enqueued packets from the N queues, while prioritizing dequeueing from the queue to which the pointer is pointing.

14 Claims, 3 Drawing Sheets

(58) Field of Classification Search
CPC ......... H04W 28/0252; H04W 28/0257; H04W 28/0263; H04W 28/0268; H04W 28/0273
See application file for complete search history.

(56) References Cited

U.S. PATENT DOCUMENTS

2003/0050954 A1* 3/2003 Tayyar ................ H04L 47/2441
718/102
2014/0185628 A1* 7/2014 Matthews ............... H04L 47/50
370/412

* cited by examiner

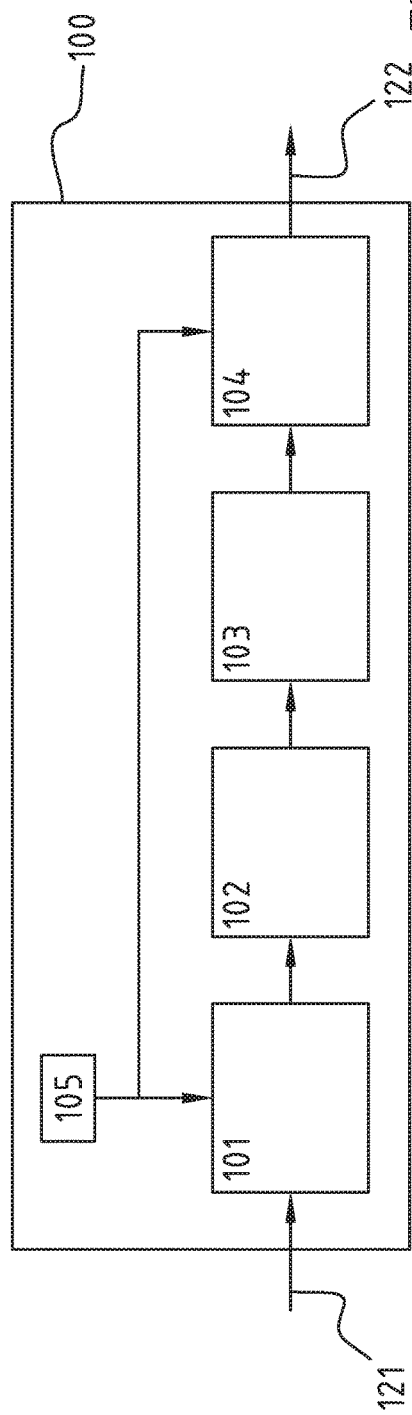
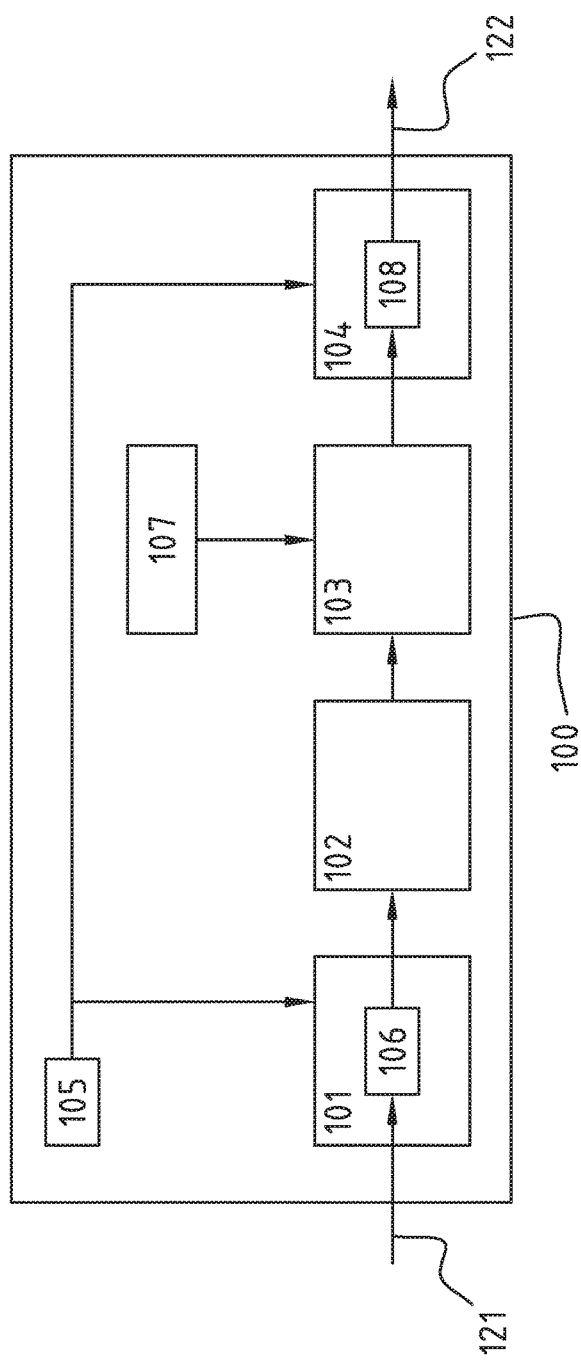

METHODS, QUEUEING SYSTEM, NETWORK ELEMENT AND NETWORK SYSTEM FOR QUEUEING AND PROCESSING OF PACKETS

CROSS-REFERENCE TO RELATED APPLICATIONS

This application is a national phase under 35 U.S.C. § 371 of PCT International Application No. PCT/EP2016/055909 which has an International filing date of Mar. 18, 2016, which claims priority to European Application No. 15305416.8, filed Mar. 23, 2015, the entire contents of each of which are hereby incorporated by reference.

FIELD OF THE INVENTION

The field of the invention relates to queueing and processing packets in packet-switched networks. Particular embodiments relate to a method and computer program product for queueing packets, a method and computer program product for processing packets, a queueing system for queueing packets, a network element for processing packets and a network system for processing packets.

BACKGROUND

More and more low-latency services are emerging over the Internet and IP (Internet Protocol) networks in general. Examples are interactive video applications, augmented reality, online gaining, future tactile interact applications using haptic or haptic-visual feedback and control, etc. These require data packets to be delivered within a specific time interval (i.e. before a specific deadline), lest they suffer (severe) quality of service degradation. Required maximum latencies reported in the literature range from 150 ms for audio, 50 ms for online gaming, and below 25 ms or even as low as 5 ms or lower for tactile applications.

Current IP networking uses a mechanism of classification, queueing, and scheduling which does not explicitly handle timing (latency) constraints, but at most operates at "best effort with some priorities". Queueing delays in network elements are variable, and packet marking/drop probabilities depend on queue lengths, which can easily cause a time-critical packet to be dropped while there are less time-critical packets queued for further processing. The dropped packets either need to be retransmitted by the source (adding extra delay) or are simply lost in the communication. End-to-end (multi-hop) latencies can easily vary over tens to even hundreds of milliseconds.

Known approaches use relative priorities, but these are limited and require inefficient computation, or waste resources.

United States Patent Application US20140185628, titled "Deadline aware queue management", discusses packet delivery deadlines, and describes traffic characteristics comprising deadline state information. The method uses (one or more) traffic characteristics to determine a priority of the packet, and selects a queue based on this priority. There are three queues corresponding to three priority classes: behind-schedule, on-schedule, and ahead-of-schedule. The classification is done by comparing the packet's deadline state information with an expected time to destination for the packet's destination.

However, the method can be ineffective, and generally wastes resources, introduces overhead and is inefficient.

SUMMARY

It is an object of embodiments of the present invention to allow effective and efficient processing of packets in packet-switched networks. Additional objects of embodiments of the present invention are to reduce resource under-utilization and to reduce overhead.

According to a first aspect of the invention, there is provided a method for queueing packets in a queueing system at a network element in a packet-switched network (i.e. a packet switching communication network, e.g. an IP network), wherein each packet of said packets is sent from a source in said packet-switched network to a destination in said packet-switched network via said network element, wherein each packet of said packets comprises timing information representing a remaining time until a deadline associated with delivery of said packet at its destination; wherein said queueing system comprises: a plurality of N queues, wherein each queue of said plurality of N queues is configured for buffering at least one packet of said packets, and wherein said plurality of N queues has a cyclic order; wherein said method comprises: keeping track of a pointer, wherein at a first point in time said pointer points to a queue of said plurality of N queues; after a second point in time succeeding said first point in time, repeatedly incrementing said pointer over said plurality of N queues, according to said cyclic order of said plurality of N queues, after each passing of a scheduling interval S, wherein said scheduling interval S represents an amount of time; enqueueing each packet of said packets in a queue of said plurality of N queues, wherein that queue differs from the queue of said plurality of N queues to which said pointer is pointing, based on said packet's timing information and taking into account said cyclic order of said plurality of N queues; and dequeueing enqueued packets from said plurality of N queues, while prioritizing dequeueing from the queue of said plurality of N queues to which said pointer is pointing.

In this manner, embodiments of the invention allow faster (i.e. more efficient) packet processing for packets or packet flows that are time-sensitive, using techniques that can advantageously be implemented in hardware, exploiting the efficiency of pointer arithmetic manipulation in hardware. The embodiment also allows for bigger buffers in the network, in order to prevent loss without an additional latency penalty for the low-latency traffic. Also, the embodiment makes possible better time-controlled packet delivery for time-sensitive services, by using a mechanism that can be implemented in router hardware for fast and efficient execution. Moreover, the method embodiment reduces overhead and increases efficiency, since packets may readily be classified based on their timing information without necessarily having to estimate times to destination and without necessarily requiring further comparison with the estimated times to destination. In particular, each packet is added to one of the N queues except the queue to which the pointer is pointing, according to the urgency of its remaining time, and meanwhile packets are dequeued from the queue to which the pointer is pointing, and (if feasible) from the following queues. This allows to queue packets in a time-sensitive manner, since packets that are already present in the queue to which the pointer is pointing are likely to be dequeued during the corresponding scheduling interval S, and urgent packets arriving during that scheduling interval S will likely be dequeued in one of the following scheduling intervals. This helps to prevent that an urgent packet arriving in a busy queue to which the pointer is pointing might get stuck in that queue after the pointer increments to the next queue, thereby reducing resource under-utilization. Also, embodiments of the invention generally reduce resource under-utilization by making better use of the available queueing space in the queues, since not all traffic of a given urgency is enqueued in a same queue but it gets spread over multiple queues. In addition, by not necessarily enqueueing all traffic of a given urgency in a same queue, the method is more effective, since traffic in other (especially less urgent) queues is more likely to be scheduled in a definite number of scheduling intervals, even if new urgent traffic keeps arriving.

Further, the embodiments are suitable for interactive video, gaming, voice traffic, tactile applications, lower priority traffic, such as software updates, email, file transfer, and in datacenters for applications that have deadline constraints.

In an embodiment, prioritizing dequeueing from the queue of said plurality of N queues to which said pointer is pointing comprises: dequeueing enqueued packets from the queue of said plurality of N queues to which said pointer is pointing, if the queue of said plurality of N queues to which said pointer is pointing contains any enqueued packets; and progressively attempting to dequeue enqueued packets from the next queues of said plurality of N queues according to said cyclic order of said plurality of N queues following the queue of said plurality of N queues to which said pointer is pointing, if the queue of said plurality of N queues to which said pointer is pointing is empty.

In this manner, urgent traffic is prioritized over less urgent traffic, while available capacity is utilized in order to dequeue packets from less-urgent queues (the first queue following the queue to which the pointer points, then the second, then the third and so on) if there are no packets in the more urgent queue or queues.

In an embodiment, enqueueing each packet of said packets in a queue of said plurality of N queues comprises: enqueueing said packet in the i-th queue of said plurality of N queues, wherein the queue to which said pointer is pointing is excluded, wherein i is counted one-based according to said cyclic order of said plurality of N queues starting from the queue following the queue to which said pointer is pointing, if the remaining time represented by the timing information of said packet exceeds a lower threshold and is inferior or equal to an upper threshold, wherein said lower threshold is equal or essentially equal to $S*(i-1)$ and said upper threshold is equal or essentially equal to $S*i$.

In this manner, arriving packets are enqueued in a fair manner that utilizes available resources effectively.

In an embodiment, said timing information of a packet is indicated in a header field of said packet, preferably in a header field meant for identifying differentiated services for said packet.

In this manner, packets' timing information is readily retrievable.

In an embodiment, said tuning information of a packet is indicated using B bits, where B is less than or equal to 6.

In this manner, packets' timing information readily fits in space that is typically easily available in packets, especially in IP packets, in particular IPv4 packets.

In an embodiment, each packet's remaining time falls within a pre-determined permissible time range R; and
wherein said scheduling interval S represents an amount of time equal or essentially equal to said pre-determined permissible time range R divided by N−1.

In this manner, the permissible time range for the packets can be covered effectively by the queues excluding the queue to which the pointer is pointing.

In an embodiment, said method comprises dynamic adjustment of said queueing system by: monitoring at least one buffering parameter of said queueing system, wherein said at least one buffering parameter comprises any one or more of the following: a number of filling levels of said plurality of N queues; and a number of packet drops in said queueing system; calculating a new scheduling interval S' for replacing said scheduling interval S, based on said at least one buffering parameter; calculating a new number N' for replacing said number N of said plurality of N queues, based on said at least one buffering parameter; and adapting said queueing system according to said new scheduling interval S' and said new number N'.

In this manner, the method allows to make efficient use of resources under changing conditions.

According to another aspect of the invention, there is provided a method for processing packets in a network element in a packet-switched communication network, wherein each packet of said packets is sent from a source in said packet-switched network to a destination in said packet-switched network via said network element, wherein each packet of said packets comprises timing information representing a remaining time until a deadline associated with delivery of said packet at its destination. Said method comprises: receiving each packet of said packets; associating each packet of said packets with an arrival timestamp from a clock; queueing of each packet of said packets according to any one of the methods of the previous claims, wherein said queueing comprises dequeueing packets; associating each dequeued packet with a departure timestamp from said clock; and dispatching each dequeued packet from said network element, based on a difference between its departure timestamp and its arrival timestamp.

In this manner, by using explicit timing information and by queueing in a time-sensitive manner, and by taking into account the time taken for processing, the method allows to control latency more effectively.

The skilled person will understand that the hereinabove described considerations and advantages with respect to the method for queueing packets also apply for embodiments of the method for processing packets, mutatis mutandis.

In an embodiment, said dispatching comprises: determining whether or not said dequeued packet has missed its deadline, based on comparing the timing information of said dequeued packet with said difference; and if it is determined that said dequeued packet has not missed its deadline, updating the timing information of said dequeued packet based on said difference and transmitting said dequeued packet to its destination; and if it is determined that said dequeued packet has missed its deadline, dropping said dequeued packet or transmitting said dequeued packet towards its destination in a best-effort manner.

In this manner, packets that have missed their deadline (or that are very likely to miss their deadline) can be dispatched (e.g. dropped or transmitted), depending on required or desired policy and on available resources.

In an embodiment, said method comprises: estimating a packet delivery time for delivering a packet to its destination; and updating the timing information of said packet, by subtracting said estimated packet delivery time from said packet's remaining time.

In this manner, the method can take into account the time a packet would further require to reach its destination when processing that packet.

According to another aspect of the invention, there is provided a queueing system for queueing packets at a network element in a packet-switched network, wherein each packet of said packets is sent from a source in said packet-switched network to a destination in said packet-switched network via said network element, wherein each packet of said packets comprises timing information representing a remaining time until a deadline associated with delivery of said packet at its destination. Said queueing system comprises: a plurality of N queues, wherein each queue of said plurality of N queues is configured for buffering at least one packet of said packets, and wherein said plurality of N queues has a cyclic order; a pointer, wherein at a first point in time said pointer points to a queue of said plurality of N queues; a scheduler configured for, after a second point in time succeeding said first point in time, repeatedly incrementing said pointer over said plurality of N queues, according to said cyclic order of said plurality of N queues, after each passing of a scheduling interval S, wherein said scheduling interval S represents an amount of time; an enqueueing module configured for enqueueing each packet of said packets in a queue of said plurality of N queues, wherein that queue differs from the queue of said plurality of N queues to which said pointer is pointing, based on said packet's timing information and taking into account said cyclic order of said plurality of N queues; and a dequeueing module configured for dequeueing enqueued packets from said plurality of N queues, while prioritizing dequeueing from the queue of said plurality of N queues to which said pointer is pointing.

The skilled person will understand that the hereinabove described considerations and advantages also apply for embodiments of the queueing system, mutatis mutandis. In particular, the skilled person will understand how to perform the steps of the applicable method embodiments described hereinabove to the elements and modules of the queueing system.

According to another aspect of the invention, there is provided a network element for processing packets in a packet-switched communication network, wherein each packet of said packets is sent from a source in said packet-switched network to a destination in said packet-switched network via said network element, wherein each packet of said packets comprises timing information representing a remaining time until a deadline associated with delivery of said packet at its destination. Said network element comprises: a clock; an input module; a queueing system; and an output module. The input module is configured for: receiving each packet of said packets; and associating each packet of said packets with an arrival timestamp from said clock. The queueing system is configured for queueing each packet of said packets according to claim 12, and in particular for dequeueing packets. The output module is configured for: associating each dequeued packet with a departure timestamp from said clock; and dispatching each dequeued packet from said network element, based on a difference between its departure timestamp and its arrival timestamp.

The skilled person will understand that the hereinabove described considerations and advantages also apply for embodiments of the network element, mutatis mutandis. In particular, the skilled person will understand how to perform the steps of the applicable method embodiments described hereinabove to the elements and modules of the network element.

In a further developed embodiment, said clock is configured for generating timestamps that have a time granularity that is less than the time granularity used for specifying the remaining time of said packets.

In an embodiment, said output module is configured for: determining whether or not said dequeued packet has missed its deadline, based on comparing the timing information of said dequeued packet with said difference; and if it is determined that said dequeued packet has not missed its deadline, updating the timing information of said dequeued packet based on said difference and transmitting said dequeued packet to its destination; and if it is determined that said dequeued packet has missed its deadline, dropping said dequeued packet or transmitting said dequeued packet towards its destination in a best-effort manner.

According to another aspect of the invention, there is provided a network system for processing of packets. Said network system comprises at least two network elements according to any of the claims 12-13, wherein said at least two network elements are communicatively coupled to each other, and wherein said at least two network elements are configured for processing packets whose remaining times fall within a same pre-determined permissible tune range R. In a preferred embodiment, said at least two network elements are configured for processing packets whose remaining times are specified using a same time granularity TU.

In this manner, a network system of multiple network elements using the same or compatible timing information settings may cooperate (thereby forming a domain) in order to more efficiently deliver packets across a packet-switched network.

The skilled person will understand that the hereinabove described considerations and advantages also apply for embodiments of the network system, mutatis mutandis.

According to another aspect of the invention, there is provided a computer program product comprising computer-executable instructions for performing a method when the program is run on a computer, the method comprising the steps of any one of the methods described hereinabove.

The skilled person will understand that the hereinabove described considerations and advantages also apply for embodiments of the computer program product, mutatis mutandis.

BRIEF DESCRIPTION OF THE FIGURES

The accompanying drawings are used to illustrate presently preferred non-limiting exemplary embodiments according to the present invention. The above and other advantages of the features of embodiments according to the invention and objects of the invention will become more apparent and the invention will be better understood from the following detailed description when read in conjunction with the accompanying drawings, in which:

FIG. 2A illustrates schematically an embodiment of a network element according to the present invention;

FIG. 2B illustrates schematically another embodiment of a network element according to the present invention.

DESCRIPTION OF EMBODIMENTS

Figure 1:
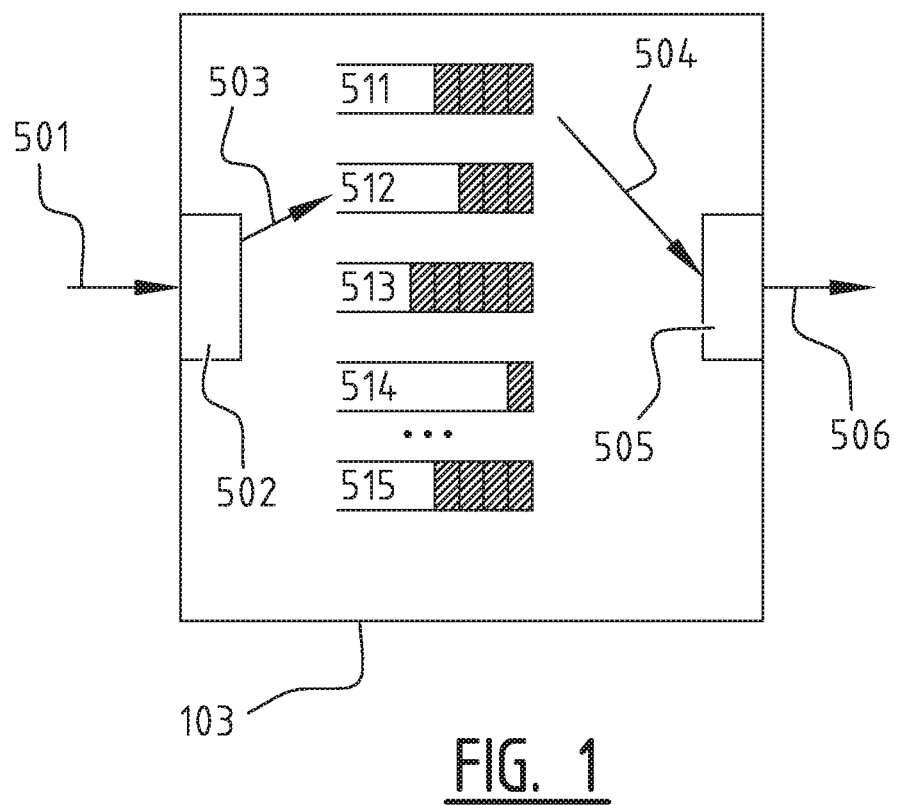
FIG. 1 illustrates schematically an embodiment of a queueing system according to the present invention.

More and more low-latency services are emerging over the Internet and IP (Internet Protocol) networks in general. Examples are interactive video applications, augmented reality, online gaming, future tactile interact applications using haptic or haptic-visual feedback and control, etc. These require data packets to be delivered within a specific time interval (i.e. before a specific deadline), lest they suffer (severe) quality of service degradation. Required maximum latencies reported in the literature range from 150 ms for audio, 50 ms for online gaming, and below 25 ms or even as low as 5 ms or lower for tactile applications.

Current IP networking uses a mechanism of classification, queueing, and scheduling which does not explicitly handle timing (latency) constraints, but at most operates at "best effort with some priorities". Queueing delays in network elements are variable, and packet marking/drop probabilities depend on queue lengths, which can easily cause a time-critical packet to be dropped while there are less time-critical packets queued for further processing. The dropped packets either need to be retransmitted by the source (adding extra delay) or are simply lost in the communication. End-to-end (multi-hop) latencies can easily vary over tens to even hundreds of milliseconds.

Currently, latency control is attempted using relative priorities, but this has several drawbacks. Differentiated services (DiffServ) is a networking architecture that specifies a simple, scalable and coarse-grained mechanism for classifying and managing network traffic and providing quality of service (QoS) on IP networks. DiffServ uses a 6-bit differentiated services code point (DSCP) in the 8-bit Differentiated services Field (DS field) in the IPv4 header for packet classification purposes. DiffServ operates on the principle of traffic classification, where each data packet is placed into a traffic class. Each router on the network is configured to differentiate traffic based on its class. Each traffic class can be managed differently, which aims to ensure preferential treatment for higher-priority traffic on the network.

However, DiffServ requires that packets (or packet flows) are positioned relatively to each other (e.g. packet A belongs to class 1, while packet B belongs to class 2), and uses coarse-grained classes. While this architecture might work for simple traffic classes (e.g. one class for VoIP (Voice over IP), another for IPTV (Internet Protocol Television), and all other traffic in a best-effort class), the variety of expected applications (and associated variety of latency requirements) cannot be served adequately. In addition, within a class, there is no differentiation between different flows or packets of a flow. All packets are treated equally.

Even in today's (simple) video applications, an explicit specification and control of the latency would provide benefits. For example, in IPTV, a channel-change requires packets from the new channel stream to be delivered very fast to the end-user to provide a good quality of experience. For another example, in HyperText Transfer Protocol (HTTP) streaming, adaptive or not, some packets are delivered into a client buffer that still holds many seconds of buffered video while other packets are delivered into a client buffer that is near to depletion (hence about to freeze the picture for the end-user).

Existing solutions either provision the (managed) service in a separate DiffServ (logical) network in such a way that other services do not interfere with the service (e.g. VoIP, IPTV), or have no solution at all (e.g. HTTP streaming at best effort).

It is possible to imagine systems in which certain packets are delivered over a higher-priority (i.e. lower-latency) Diff-Serv class, but then it may be problematic to decide which packets belong to which class, as an application would only be able to rate its own packets relative to each other, but not in relation to packets from other users or streams.

Embodiments according to the present invention use explicit timing information in packets particular data packets, such as IP packets) to indicate a deadline associated with the packet—that is, by when a packet needs to be delivered to the destination.

To this end, the present subject-matter pertains to a method for queueing packets in a queueing system at a network element in a packet-switched network (i.e. a packet switching communication network, e.g. an IP network), wherein each packet of said packets is sent from a source in said packet-switched network to a destination in said packet-switched network via said network element, wherein each packet of said packets comprises timing information representing a remaining time until a deadline associated with delivery of said packet at its destination; wherein said queueing system comprises: a plurality of N queues, wherein each queue of said plurality of N queues is configured for buffering at least one packet of said packets, and wherein said plurality of N queues has a cyclic order; wherein said method comprises: keeping track of a pointer, wherein at a first point in time said pointer points to a queue of said plurality of N queues; after a second point in time succeeding said first point in time, repeatedly incrementing said pointer over said plurality of N queues, according to said cyclic order of said plurality of N queues, after each passing of a scheduling interval S, wherein said scheduling interval S represents an amount of time; enqueueing each packet of said packets in a queue of said plurality of N queues, wherein that queue differs from the queue of said plurality of N queues to which said pointer is pointing, based on said packet's timing information and taking into account said cyclic order of said plurality of N queues; and dequeueing enqueued packets from said plurality of N queues, while prioritizing dequeueing from the queue of said plurality of N queues to which said pointer is pointing.

The timing information can be specified in TimeUnits (TU, e.g. 1 TU=1 ms) and may be included in the packet header, for example using a number of B bits (e.g. B=12 bits), forming the TI (Time Indicator in TimeUnits) and TIS (TimeIndicator in seconds, with TIS=TI*TU). This allows timing specifications in the range $[0, ((2^B)-1)*TU]$, with granularity TU. These values may have been pre-determined—that is, agreed on in advance—or they may be determined dynamically. A value of 0 may mean that no time remains (i.e. that the deadline has been missed), or a value of 0 may be used as a convention to indicate that the packet has no associated timing constraint. In the latter case, the packet may still be delivered at best-effort. This may then result in an actual range $[TU, ((2^B)-1)*TU]$.

Embodiments of the invention may use the following example marking scheme, using the DSCP bits in an IPv4 header (or the traffic class in an IPv6 header). In an exemplary embodiment, the 6-bit DSCP field can be used as a combination of 1) (optionally) P bits to mark the traffic class (just as in traditional DiffServ), in which case separate TimeServ system can be run per traffic class. If P=0, all traffic belongs to one class.
2) B (=6−P) bits to mark the timing information to deliver this packet to the destination.

For instance, using the 0 value as a convention as described above, P=2 might indicate four traffic classes, with e.g.

(i) in class 0x01: B=4 and TU=5 ms allowing time specifications in the range [5 ms, 75 ms] with granularity 5 ms;

(ii) in class 0x02: B=4 and TU=100 ms, allowing time specifications in the range [100 ms, 1500 ms] with granularity 100 ms; and (iii) in class 0x03: no TimeServ.

Alternatively a packet header option could be used to provide any required range and granularity, depending on the number of bits B used for the header option. In some embodiments, a number of flow label bits in the IPv6 header can be redefined and used. For example, using ten of the twenty flow label bits, with TU=1 ms, allows time specifications in the range [1 ms, 1023 ms] with a granularity of 1 ms (again using the optional convention of the value 0 as described above).

Applications can use this marking scheme to clearly (via an absolute metric) specify by when a packet should be delivered to the destination (e.g. "This packet must be delivered to the other side within M ms"). The network system, network elements therein, and queueing systems therein can compare requirements for different packets (or flows) by direct comparison of the timing information and treat the packets in the network in an apt way. It is noted that two packets can always be compared to each other based on their required delivery time (in other words, on the remaining time until their respective deadlines), within the granularity TV used in the time coding scheme described above.

As indicated above, in certain embodiments according to the present invention, a time specification of 0 means that best effort should be used. This is an optional convention. In other embodiments, the time specification 0 may effectively mean that no time is left, and thus that the packet has missed its associated deadline. Timeouts can be treated with different alternative options. Packets that time out from a non-zero value to zero can either be dropped or can fall back to be treated at best effort. If the zero value is not used as a best-effort indication (for instance, if other bits are used to classify best effort), the range can be extended from, for example, [1 ms, 1023 ms] to [1 ms, 1024 ms], where 0 means 1 ms and 1023 means 1024 ms. In this case, packets that time out from 1 ms (value 0) can be dropped or can optionally be remarked to another class using classification bits, such as the above described P bits.

FIG. 1 illustrates schematically an embodiment of a queueing system 103. In queueing system 103, a cyclically-ordered plurality of queues 511-515 is used (five queues are shown, but it will be understood that another number of queues can be used, typically depending on hardware costs). Generally speaking, N queues are provided, and each queue can be denoted as Q[i], with i from 0 to N−1. The queues 511-515 are cyclically ordered in that, when a pointer (not shown) to the last of the queues (here queue 515) is incremented, the pointer is set to the first of the queues (here queue 511). Another name for this configuration is round-robin. The skilled person is aware of how to use modulo-based schemes to achieve this effect.

The queueing system 103 of FIG. 1 is dynamic, in that incoming packets 501 can be enqueued 503 (i.e. buffered) in one of multiple queues 511-515. The dynamicity comes from choosing in which queue 511-515 to enqueue the incoming packet 501. Further dynamicity comes from dequeueing 504 packets from the multiple queues 511-515, for further transmission 506 (or for dropping, not shown).

In particular, the queueing system 103 may be initialized at a first point in time with the pointer pointing to a pre-defined or to a random queue, say queue 511. For the operation of the queueing system 103 it does not matter which queue is initially pointed to.

The queueing system 103 also comprises a scheduler (not shown) that is configured for, after a second point in time succeeding said first point in time, repeatedly incrementing said pointer over the queues 511-515, according to their cyclic order, after each passing of a scheduling interval S, wherein said scheduling interval S represents an amount of time. In other words, every scheduling interval S, the next queue of the queues 511-515 is pointed to.

The queueing system 103 also comprises an enqueueing module 502 that is configured for enqueueing 503 each packet of said packets 501 in a queue of said plurality of N queues 511-515. The enqueueing 503 is done in the N−1 other queues than the queue pointed to by the pointer. Suppose that the pointer in FIG. 1 is currently pointing to queue 511. Then each packet 501 is enqueued 503 in one of the other queues 512-515, based on that packet's 501 timing information and taking into account the cyclic order of the queues. In other words, the other N−1 queues 512-515 are used to enqueue 503 the packet 501 depending on how much remaining time it has to reach its destination. If the packet 501 is very urgent, it may be enqueued 503 in the next queue 512 following the queue 511 to which the pointer is pointing. If the packet 501 is less urgent, it may be enqueued 503 in one of the further queues 513-515. In this manner, the queues 512-515 cover the range of the remaining times of all incoming packets 501.

It is noted that arriving packets 501 are not enqueued 503 in the queue 511 to which the pointer is pointing. For this reason, very urgent packets 501 run no risk of being enqueued 503 in queue 511 just before the pointer is incremented to point to the next queue 512, and of having to remain buffered in that queue 511 until after their deadline has been missed, but are enqueued 503 in the next queue 512 or one of the further queues 513-515 depending on their urgency.

The queueing system 103 also comprises a dequeueing module 505 that is configured for dequeueing 504 the enqueued packets from the queues 511-512, while prioritizing dequeueing from the queue 511 to which said pointer is pointing. In other words, the dequeueing module 505, during a given scheduling interval, prioritizes the dequeueing 504 of packets from the queue 511 to which the pointer is pointing, and thereby is most likely to dequeue 504 the most urgent packets. If no very urgent packets are enqueued or buffered in that queue 511, the dequeueing module 505 may attempt to dequeue packets from the next queue 512, to make more efficient use of resources. If the next queue 512 also or no longer contains any packets, the dequeueing module 512 may progress to the next queue 513 and attempt to dequeue packets from that queue 513. This shows that packets may be dequeued 503 from further queues 512-513 according to the cyclic order during the same scheduling interval. If no packets are buffered (anymore) in the next queue 513, the dequeueing module 505 may progress even further to the next queue 514, and so on. If a packet would meanwhile be enqueued in an earlier queue (for example, in queue 512 while the dequeueing module 505 is dequeueing from queue 513, while the pointer is still pointing to queue 511), the dequeueing module 505 may be notified thereof and first dequeue that packet before continuing to dequeue the further queue 513. Alternatively, the dequeueing module 505 may simply progress through all queues 512-515 (i.e. excluding queue 511, in which no new packets are enqueued during that scheduling interval) in a round-robin manner, for ease of implementation.

In an exemplary embodiment, the following values hold:
Choose G such that the scheduling granularity $S=(2^G)$*TU. E.g. if TU=5 ms, G=1 would make S=10 ms; another example: if TU=1 ms, G=3 would make S=8 ms.

The number of queues N needed=$(2^B)/(2^G)+1=2^{(B-G)}+1$. E.g. TU=5 ms, B=4, G=1 then N=9; in the other example: TU=1 ms, B=10, G=3 then N=129.

In that embodiment, each arriving packet is put in a queue according to its TI value: $Q[(i+z) \bmod N]$ holds all packets with $S*(i-1)<TIS<=S*(i)$, for $1<=i<=N-1$, where z is initially 0, but gets updated by the scheduler as described below. The skilled person will understand that z may be implemented as a pointer. The dequeueing module may perform strict priority scheduling on the set of queues, serving packet from Q[z] if it is not empty, else serving packets from Q[z+1], and so on (where the addition operation '+' is executed modulo N). At the end of each interval S, Q[z] is incremented by 1 modulo N. Note that Q[z] is not filled anymore with new packets because i starts from 1 (i.e. the queue to which pointer z is pointing is excluded). It only contains packets that were not scheduled during the previous interval and need to be sent with first priority.

The queueing system 103 can use a scheduling granularity S, treating all packets i and j with $|TIS_i-TIS_j|<S$ without distinction (i.e. the system would treat them in the same FIFO queue). The system can be made adaptive by monitoring the filling levels of the queues, as well as the number of discarded or dropped packets in Q[z], and adapt S (and/or other parameters like N) online to use a different granularity (thereby making the tradeoff of using more queues to work with a finer time granularity and drop less packets unnecessarily, versus using less queues when it is possible.)

FIG. 2A illustrates schematically an embodiment of a network element according to the present invention. In particular, FIG. 2A shows a network element, such as a router 100, a switch, etc. The router 100 comprises a (preferably monotonic) clock 105 that can output a timestamp, an input module 101, a routing module 102 (or switching module, etc.), a queueing system 103, and an output module 104. Packets from a source (not shown) are received 121 at the router 100 in the input module 101, and are eventually transmitted 122 from the output module 104 to their destination (not shown), or dropped. FIG. 2A further shows that the clock 105 can provide its timestamp to the input module 101 and the output module 104.

Nevertheless, the skilled person will understand that the structural lay-out presented in FIG. 2A is only one possible structural lay-out for achieving a certain behavior, and that other structural lay-outs may also be found to be at least functionally equivalent.

The network element (here a router) 100 is suitable for processing packets in a packet-switched communication network. Each packet of said packets is sent from a source in said packet-switched network to a destination in said packet-switched network via said network element 100. Each packet of said packets comprises timing information representing a remaining time until a deadline associated with delivery of said packet at its destination.

The input module 101 is configured for: receiving 121 each packet of said packets; and associating each packet of said packets with an arrival timestamp from said clock 105.

The routing module 102 is optional, and may be configured to perform the typical routing tasks of a router 100.

The queueing system 103 is configured for queueing each packet of said packets as described above with respect to FIG. 1. In particular, the queueing system 103 may be configured for dequeueing packets and providing these to the output module 104.

The output module 104 is configured for: associating each dequeued packet with a departure timestamp from said clock 105; and dispatching 122 each dequeued packet from said network element, based on a difference between its departure timestamp and its arrival timestamp.

In further developed embodiments, the output module 104 is configured for: determining whether or not said dequeued packet has missed its deadline, based on comparing the timing information of said dequeued packet with said difference. If the output module 104 determines that said dequeued packet has not missed its deadline, it may update the timing information of said dequeued packet based on said difference and transmit 122 said dequeued packet to its destination. If the output module 104 determines that said dequeued packet has missed its deadline, it may drop said dequeued packet or transmit 122 said dequeued packet towards its destination in a best-effort manner.

In an exemplary embodiment, the router 100 is configured to perform the following operations:

An incoming packet is received 121.

A timestamp TS_in generated by clock 105 is associated with the incoming packet. The granularity of the timestamp is preferably <=TU.

The packet is classified by the routing module 102 in a queueing system 103 at the correct outgoing link (selected as in traditional IP routing or switching), using the TI header field.

Packets are scheduled (i.e. dispatched) from the queueing system 103 for transmission 122 on the outgoing link. At that time, another timestamp TS_now is generated by clock 105 and that timestamp TS_now is used by the output module 104 to update the TI header with the value: TI←TI−(TS_now−TS_in), preferably rounded to the granularity of TU. This subtracts the amount of time that the packet was being processed or queued in the (queueing system 103 of the) network element (router 100) from the TI value. Also, this adapts the time left for the packet to be delivered to the destination.

Optionally, the TI can be further reduced by the (estimated) transmission time to reach the next TimeServ element. The skilled person will appreciate that this further reduction is especially advantageous if this value is comparable to the value of TI in order of magnitude.

In case TI>0, the packet is to be sent out 122 by the output module 104. In case TI<=0 the packet delivery time has expired and the packet is dropped (by the output module 104). Dropping may be optional and the decision whether or not to drop can be driven by an indication in the packet.

FIG. 2B illustrates schematically another embodiment of a network element according to the present invention. In particular, FIG. 2B shows a network element, such as a router 100, a switch, etc. The router 100 comprises a (preferably monotonic) clock 105 that can output a timestamp, an input module 101, a routing module 102 (or switching module, etc.), a queueing system 103, and an output module 104. This embodiment of the router 100 may operate in the same manner as the embodiment of the router 100 described with respect to FIG. 2A.

The router 100 of FIG. 2B further comprises an optional input control module 106, an optional queue optimizer 107, and an optional output control module 108. The input control module 106 may be configured to control a predetermined policy for the settings used by the network element 100. In particular, the input control module 106 may verify and even enforce that incoming packets use a compliant timing information specification. The queue optimizer 107 may be configured to optimize the queued packets in one or more of the queues of the queueing system 103 in order to improve further processing and/or delivery, preferably of the queues to which the pointer is not pointing. The output control module 108 may be configured to control the timing information of each packet in function of the required timing information settings for a neighbouring network element or network system, if that neighbouring network element or network system uses different (incompatible) timing information settings, for example by translating, for each packet prepared for transmission, said timing information of said packet based on store timing information settings for that neighbouring network element or network system. The translating may comprise recalculating the timing granularity, and/or re-indicating the timing information if that is stored in a different place or manner.

Figure 3:
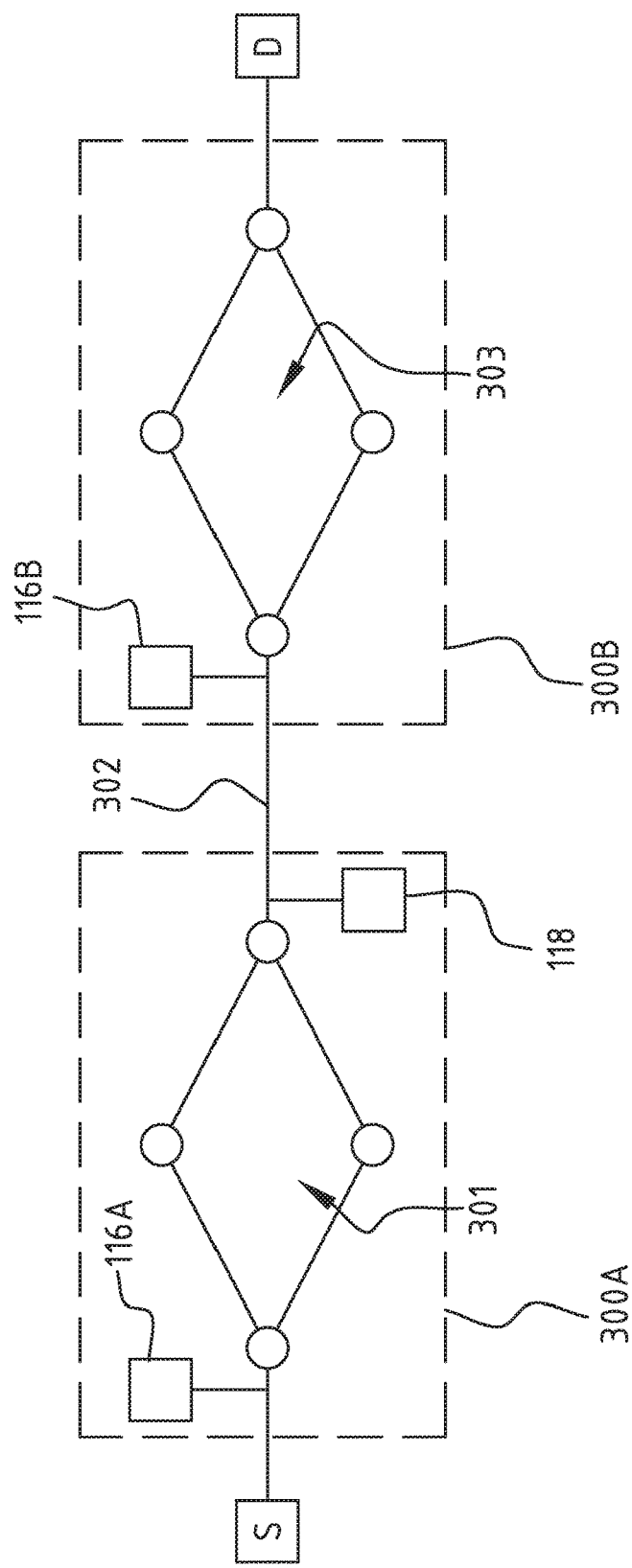
FIG. 3 illustrates schematically two embodiments of a network system according to the present invention.

FIG. 3 illustrates schematically two embodiments of a network system according to the present invention, namely a first system 300A and a second system 300B, which are situated in a packet-switched communication network. The first 300A and second 300B system are shown as intermediate between a source S and a destination D (directly or indirectly via one or more other intermediate network elements), and the first 300A and second 300B system are communicatively linked 302 to each other. Nevertheless, the skilled person will understand that three, four or more systems may also be provided, or that even one single system may be provided.

The first system 300A comprises a number of network elements 301 as described above. The second system 300B also comprises a number of network elements 303 as described above. In FIG. 3, four network elements are shown for each system, but it will be understood that less or more than four network elements may be used for each system, and that the number of network elements for each system is independent from the number of network elements for other systems in the same network.

A group of communicatively coupled network elements, such as routers and/or switches, that implement the same or at least a compatible coding scheme and TU size, and use the same policies of operating on them, comprises what may be called a 'TimeServ domain', since internally compatible timing scheduling is performed, in analogy with the 'DiffServ domain' for priority scheduling. For convenience of naming, each system in FIG. 3 may therefore be called a. 'TimeServ domain', since it operates internally based on pre-agreed timing parameters (i.e. time coding schemes).

Network elements at the boundary of TimeServ domains can map or re-mark (i.e. translate) between the time coding schemes in both domains (and possible the used field in the packet header if they should be different). This functionality is represented schematically in FIG. 3 using block 118, which may be a module comprised at one of the network elements 301 that is situated at the boundary of its respective TimeServ domain, or which may a separate network element situated at that boundary. The role of block 118 is to map or re-mark the timing information, from the first system 300A to the second system 300B. Re-marking is preferably done such that the TI in the new domain <=the TI in the old domain.

A companion policy system may allow the operator to specify policies or quota to encourage end-users and applications to mark packets truthfully, and not more urgent than their policy or subscription allows. For example, an IPTV subscriber would be allowed have a certain fraction of very urgent packets to be delivered for the purpose of changing channels (so as to quickly receive packets of the new channel), but in general would have transmission time values of, say, 500 ms or more, and use buffering when viewing a channel in steady-state. A monitoring and policing function at the TimeServ ingress points may be required to enforce these policies. Such a monitoring and policing function is shown schematically by blocks 116A and 116B, for the first system 300A and the second system 300B respectively. These blocks 116A and 116B may be modules comprised at one, some or all of the network elements 301 and 303 that are situated in the respective systems 300A and 300B, or they may be separate network elements enforcing policy for the entire TimeServ domain.

In the present specification 'equal or essentially equal' may mean 'exactly equal in a mathematical sense, or equal to some appreciably small difference', in accordance with common computer engineering practice, e.g. due to rounding needs.

A person of skill in the art would readily recognize that steps of various above-described methods can be performed by programmed computers. Herein, some embodiments are also intended to cover program storage devices, e.g. digital data storage media, which are machine or computer readable and encode machine-executable or computer-executable programs of instructions, wherein said instructions perform some or all of the steps of said above-described methods. The program storage devices may be, e.g. digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC) field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer.

Whilst the principles of the invention have been set out above in connection with specific embodiments, it is to be understood that this description is merely made by way of example and not as a limitation of the scope of protection which is determined by the appended claims.

The invention claimed is:

1. A method for queueing packets in a queueing system at a network element in a packet-switched network,
    wherein each packet of said packets is sent from a source in said packet-switched network to a destination in said packet-switched network via said network element;
    wherein each packet of said packets comprises timing information representing a remaining time until a deadline associated with delivery of said packet at its destination;
    wherein said queueing system comprises:
        a plurality of N queues, wherein each queue of said plurality of N queues is configured for buffering at least one packet of said packets, and wherein said plurality of N queues has a cyclic order;
    wherein said method comprises:
        keeping track of a pointer, wherein at a first point in time said pointer points to a queue of said plurality of N queues;
        after a second point in time succeeding said first point in time, repeatedly incrementing said pointer over said plurality of N queues, according to said cyclic order of said plurality of N queues, after each passing of a scheduling interval S, wherein said scheduling interval S represents an amount of time;
        enqueueing each packet of said packets in a queue, of said plurality of N queues, that differs from the queue of said plurality of N queues to which said pointer is pointing, based on said packet's timing information and taking into account said cyclic order of said plurality of N queues,
        wherein enqueueing each packet of said packets comprises:
            in response to the remaining time represented by the timing information of said packet exceeding a lower threshold and being less than or equal to an upper threshold, enqueueing said packet in an i-th queue of said plurality of N queues, wherein the queue to which said pointer is pointing is excluded, wherein i is counted one-based according to said cyclic order of said plurality of N queues starting from a queue following the queue to which said pointer is pointing, wherein said lower threshold is equal or essentially equal to S*(i−1) and said upper threshold is equal or essentially equal to S*i; and
        dequeueing enqueued packets from said plurality of N queues, while prioritizing dequeueing from the queue of said plurality of N queues to which said pointer is pointing.

2. The method of claim 1, wherein prioritizing dequeueing from the queue of said plurality of N queues to which said pointer is pointing comprises:
    dequeueing enqueued packets from the queue of said plurality of N queues to which said pointer is pointing, in response to the queue of said plurality of N queues to which said pointer is pointing containing any enqueued packets; and
    progressively attempting to dequeue enqueued packets from next queues of said plurality of N queues following the queue of said plurality of N queues to which said pointer is pointing, according to said cyclic order of said plurality of N queues, in response to the queue of said plurality of N queues to which said pointer is pointing being empty.

3. The method of claim 1, wherein said timing information of a packet is indicated in a header field of said packet.

4. The method of claim 3, wherein said timing information of a packet is indicated in a header field of said packet meant for identifying differentiated services for said packet.

5. The method of claim 1, wherein said timing information of a packet is indicated using B bits, where B is less than or equal to 6.

6. The method of claim 1, wherein each packet's remaining time falls within a pre-determined permissible time range R; and
    wherein said scheduling interval S represents an amount of time equal or essentially equal to said pre-determined permissible time range R divided by N−1.

7. The method of claim 1, comprising dynamic adjustment of said queueing system by:
    monitoring at least one buffering parameter of said queueing system, wherein said at least one buffering parameter comprises any one or more of the following: a number of filling levels of said plurality of N queues; and a number of packet drops in said queueing system;
    calculating a new scheduling interval S' for replacing said scheduling interval S, based on said at least one buffering parameter;
    calculating a new number N' for replacing said number N of said plurality of N queues, based on said at least one buffering parameter; and
    adapting said queueing system according to said new scheduling interval S' and said new number N'.

8. The method of claim 1 further comprising:
    receiving each packet of said packets;
    associating each packet of said packets with an arrival timestamp from a clock;
    queueing each packet of said packets according to the method of claim 1, wherein said queueing comprises dequeueing packets;
    associating each dequeued packet with a departure timestamp from said clock; and
    dispatching each dequeued packet from said network element, based on a difference between its departure timestamp and its arrival timestamp.

9. The method of claim 8, wherein said dispatching comprises:
    determining whether said dequeued packet has missed its deadline, based on comparing the timing information of said dequeued packet with said difference; and
    in response to determining that said dequeued packet has not missed its deadline, updating the timing information of said dequeued packet based on said difference and transmitting said dequeued packet to its destination; and in response to determining that said dequeued packet has missed its deadline, dropping said dequeued packet or transmitting said dequeued packet towards its destination.

10. The method of claim 8, comprising:
estimating a packet delivery time for delivering a packet to its destination; and
updating the timing information of said packet, by subtracting said estimated packet delivery time from said packet's remaining time.

11. A queueing system for queueing packets at a network element in a packet-switched network,
wherein each packet of said packets is sent from a source in said packet-switched network to a destination in said packet-switched network via said network element,
wherein each packet of said packets comprises timing information representing a remaining time until a deadline associated with delivery of said packet at its destination;
wherein said queueing system comprises:
a plurality of N queues, wherein each queue of said plurality of N queues is configured for buffering at least one packet of said packets, and wherein said plurality of N queues has a cyclic order;
a pointer, wherein at a first point in time said pointer points to a queue of said plurality of N queues;
a scheduler configured for, after a second point in time succeeding said first point in time, repeatedly incrementing said pointer over said plurality of N queues, according to said cyclic order of said plurality of N queues, after each passing of a scheduling interval S, wherein said scheduling interval S represents an amount of time;
an enqueueing module configured for enqueueing each packet of said packets in a queue, of said plurality of N queues that differs from the queue of said plurality of N queues to which said pointer is pointing, based on said packet's timing information and taking into account said cyclic order of said plurality of N queues,
wherein enqueueing each packet of said packets comprises:
in response to the remaining time represented by the timing information of said packet exceeding a lower threshold and being less than or equal to an upper threshold, enqueueing said packet in an i-th queue of said plurality of N queues, wherein the queue to which said pointer is pointing is excluded, wherein i is counted one-based according to said cyclic order of said plurality of N queues starting from a queue following the queue to which said pointer is pointing, wherein said lower threshold is equal or essentially equal to $S*(i-1)$ and said upper threshold is equal or essentially equal to $S*i$; and
a dequeueing module configured for dequeueing enqueued packets from said plurality of N queues, while prioritizing dequeueing from the queue of said plurality of N queues to which said pointer is pointing.

12. A network element for the queueing system of claim 11, for processing packets in a packet-switched communication network, the network element comprising:
a clock;
an input module configured for:
receiving each packet of said packets; and
associating each packet of said packets with an arrival timestamp from said clock;
a queueing system for queueing each packet of said packets according to the queueing system of claim 11;
an output module configured for:
associating each dequeued packet with a departure timestamp from said clock; and
dispatching each dequeued packet from said network element, based on a difference between its departure timestamp and its arrival timestamp.

13. The method of claim 8, wherein said output module is configured for:
determining whether said dequeued packet has missed its deadline, based on comparing the timing information of said dequeued packet with said difference; and
in response to determining that said dequeued packet has not missed its deadline, updating the timing information of said dequeued packet based on said difference and transmitting said dequeued packet to its destination; and
in response to determining that said dequeued packet has missed its deadline, dropping said dequeued packet or transmitting said dequeued packet towards its destination.

14. A non-transitory computer readable medium storing instructions, which when executed by a computer, cause the computer to perform the method of claim 1.

* * * * *